United States Patent [19]
Ledon et al.

[11] Patent Number: 5,932,187
[45] Date of Patent: Aug. 3, 1999

[54] PROCESS FOR THE PREPARATION OF AN ULTRA PURE HYDROGEN PEROXIDE SOLUTION BY IONIC EXCHANGE IN BEDS HAVING DEFINED H/D RATIOS

[75] Inventors: Henry Ledon; Christine Devos, both of Versailles, France

[73] Assignee: L'Air Liquide, Societe Anonyme pour l'Etude et l'Exploitation des Procedes Georges Claude, Paris, France

[21] Appl. No.: 08/867,962

[22] Filed: Jun. 3, 1997

[30] Foreign Application Priority Data

May 27, 1997 [FR] France ................................. 97 06472

[51] Int. Cl.⁶ .................................................. C01B 15/01
[52] U.S. Cl. ............................................................... 423/584
[58] Field of Search ................................................ 423/584

[56] References Cited

U.S. PATENT DOCUMENTS 3,074,782  1/1963  Meeker et al.
4,999,179  3/1991  Sugihara et al. ......................... 423/584
5,733,521  3/1998  Minamikawa et al. ................. 423/584

FOREIGN PATENT DOCUMENTS 0 774 442  10/1996  European Pat. Off.
51025      8/1965   Germany.
09071406   3/1997   Japan.
WO96/39237 12/1996  WIPO.

*Primary Examiner*—Wayne Langel
*Attorney, Agent, or Firm*—Burns, Doane, Swecker & Mathis, L.L.P.

[57] ABSTRACT

Provided is a process for the preparation of an ultrapure hydrogen peroxide solution. The process includes at least one sequence which includes successively passing a solution to be purified through at least one bed of cation-exchange adsorbents (CEA) and at least one bed of anion-exchange adsorbents (AEA). The beds of adsorbents each exhibit a height to diameter ratio of greater than 3. Also provided is a plant for the implementation of the inventive process.

11 Claims, No Drawings

PROCESS FOR THE PREPARATION OF AN ULTRA PURE HYDROGEN PEROXIDE SOLUTION BY IONIC EXCHANGE IN BEDS HAVING DEFINED H/D RATIOS

BACKGROUND OF THE INVENTION

The use of hydrogen peroxide for advanced technology applications or applications in the food industry, in hygiene or health requires increasingly pure products which must meet a growing number of increasingly tight specifications. In particular, the demands of users are turning towards hydrogen peroxide solutions in which the content of each metal impurity is less than one part per billion (ppb) and preferably less than 500 parts per trillion (ppt). In the following account, such solutions will be known as ultrapure hydrogen peroxide solutions.

It is well known, according to the prior art, that it is possible to remove certain impurities by passing the solution through a bed of ion-exchange adsorbents. Mention may be made, for example, of functionalized polymers of polystyrene/divinylbenzene type, silicas or aluminosilicates, in particular the varieties containing controlled micropores, such as zeolites, or active charcoals; these solids carry functional groups capable of complexing either cations or anions. Mention may be made, as examples of functional groups capable of complexing cations, of the carboxylic, sulphonic, phosphonic, hydroxide, amine oxide or phosphine oxide groups or alternatively of cyclic or open polyoxaalkyls, such as, for example, ethylene oxide polymers. Mention may be made, as examples of functional groups capable of complexing anions, of the quaternary ammonium or phosphonium groups. These adsorbents can also be obtained by polymerization of a monomer carrying a functional group, for example poly(methacrylic acid)s, phosphonic acids, polyvinylpyridines, polyvinylpyrrolidones, poly(vinyl alcohol)s, saponified polylactones and copolymers containing these units. The adsorbents which are the most often described are polystyrene gels or crosslinked polystyrenes possessing sulphonic —$SO_3H$ or trimethylammonium $(CH_3)_3N^+$— functional groups.

Many combinations have been provided, such as, for example, anionic resin followed by cationic resin or cationic resin followed by anionic resin or alternatively anionic resin followed cationic resin followed by cationic+anionic "mixed bed". Additions to the inter-stage phases are also described, such as, for example, the addition of acid in order to modify the pH or the addition of chelating agents, such as aminomethylenecarboxylic or aminomethylenephosphonic derivatives.

It is well known to the person skilled in the art that the use of anion-exchange adsorbents presents great difficulties when employed for the purification of hydrogen peroxide. In particular, the hydroxide form, under which these products are generally available industrially, cannot be used directly because of its excessively high basicity, resulting in significant decomposition of hydrogen peroxide. Many publications describe the use of adsorbents exchanged by carbonate or bicarbonate ions, which are less basic, in order to limit the decomposition of hydrogen peroxide, without, however, eliminating it completely.

DETAILED DESCRIPTION OF PREFERRED EMBODIMENTS OF THE INVENTION

The subject of the present invention is a process for the preparation of an ultrapure hydrogen peroxide solution, characterized in that it comprises at least one sequence which includes successively passing the solution to be purified through at least one bed of cation-exchange adsorbents (CEA) and at least one bed of anion-exchange adsorbents (AEA) and characterized in that the beds of adsorbents each exhibit a height to diameter ratio of greater than 3.

The subject of the present invention is in particular a process as defined above, in which the said ratio is, in particular, between 5 and 10 and, more particularly, approximately 6.

The hydrogen peroxide solution throughputs, expressed as volume of solution/hour passed per volume of bed of adsorbent, can vary between 0.5 and 100, preferably from 1 to 50 and more particularly from 10 to 30.

The hydrogen peroxide solution to be purified according to the present invention is a technical aqueous solution having a concentration of 1 to 70% by weight and preferably of 5 to 50% by weight. The adsorbents are chosen from those which are described above.

The anion-exchange adsorbents will preferably be fed in an upward mode, whereas the cation-exchange adsorbents will preferably be fed in a downward mode. It is possible to define the geometries of the beds so that the true space velocities and/or throughputs in each adsorbent are optimized. It is also possible to operate under pressure. Preferably, a working pressure of less than 5 atm above atmospheric pressure will be chosen.

The temperature of the solution to be purified according to the process as described above is less than or equal to 30° C. and preferably between −10° C. and +10° C.

In a preferred alternative form of the process, at least one bed of anion-exchange adsorbents contains carboxylate ions of formula R—COO⁻ in which R represents a hydrogen atom, an aryl radical containing from 6 to 10 carbon atoms or an alkyl radical containing from 1 to 4 carbon atoms, the said aryl and alkyl radicals being either unsubstituted or substituted by one or more fluorine atoms. Carboxylate ion of formula R—COO⁻ is understood to mean in particular the trifluoroacetate ion or the benzoate ion, the formate ion, the acetate ion or the fluoroacetate ion, and preferably the acetate ion.

In an alternative form of the process as defined above, it comprises, upstream or downstream of sequences for passing the solution to be purified through the beds of ion-exchange adsorbents, one or more purification stages, such as, for example, distillation, liquid extraction, crystallization, absorption, filtration, ultrafiltration, nanofiltration or reverse osmosis. If appropriate, the starting solution is brought beforehand to the desired assay and then purified. Depending on the degree of purity and of dilution of the hydrogen peroxide solution to be purified, one or more of these additional stages is/are employed.

In a first preferred alternative form of the present invention, the technical hydrogen peroxide solution to be purified, which is at a concentration of 30% to 70% by weight, is distilled and brought to the desired assay beforehand and then purified through at least two beds of ion-exchange adsorbents, according to the sequence which is the subject of the present invention.

According to a second alternative form of the purification process which is the subject of the present invention, a hydrogen peroxide solution of technical quality or of so-called "food" quality, having a concentration of approximately 50 to 70% by weight, is subjected to the following pretreatment: a first distillation/concentration stage, in order to obtain a condensate having a concentration of greater than 80%, plus a first purification by low-temperature crystallization and the removal of the supernatant. The crystals collected are washed, superficially dried and then melted and the solution obtained is diluted to 30 or 35% with deionized water of ultrapure electronic quality.

In a third preferred alternative form of the present invention, in particular if the carbon content of the hydrogen peroxide solution is a constraint forming an integral part of the required specifications, a second bed of anion-exchange adsorbent can be added to the purification line in order to retain the carboxylate ions released by the complexation of the metal impurities in the first bed of anion-exchange adsorbent.

It is thus possible very easily to obtain, from an ordinary technical quality hydrogen peroxide solution, a hydrogen peroxide solution of "electronic" quality containing less than 200 ppt of each of the metal cations from groups IA to VIIA (with the exception of oxygen) and from groups IB to VIII of the table of the Periodic Classification of the Elements.

Mention may be made, by way of illustration of the purification process which is the subject of the present invention, of, for example, the series of sequences: AEA (acetate)/CEA/AEA (bicarbonate or carbonate)/CEA.

Another subject of the invention is a plant for the implementation of the process as defined above.

In a preferred alternative form of the present plant, the beds of anion-exchange adsorbents are fed in upward mode and the beds of cation-exchange adsorbents are fed in downward mode.

In another preferred alternative form of the plant, the latter is situated on the customer's site, such as, for example, a site for the manufacture of electronic components, and connected directly to the point of use of the hydrogen peroxide by the customer.

The following examples illustrate the invention without, however, limiting it.

EXAMPLES a) Comparative Example

A purification unit contains two columns filled respectively with 3 liters of an anion-exchange resin Dowex Monosphere A 550 UPE, which has been exchanged beforehand with a sodium bicarbonate solution and washed with water, and 3 liters of a cation-exchange resin Dowex Monosphere C 650 UPN. The diameter of the columns is approximately 11.7 centimeters, which gives a bed height of 28 centimeters, i.e. a height/diameter ratio of 2.6.

A 30% by weight aqueous hydrogen peroxide solution (solution A), obtained by diluting a 60% by weight commercial solution (solution B) with ultrapure water, is introduced with a throughput of 130 liters per hour, in upward mode, into the first (AEA) column and then, in downward mode, into the second (CEA) column; the purified solution obtained at the outlet of the (CEA) column is again passed through the same resins according to the sequence (AEA) then (CEA). The overall time for passing the solution to be treated through a bed is consequently thus 1.2 minutes. The solution C is obtained. The concentrations in ppt of the main critical elements are as follows:

|  | Na | Al | Ca | Fe |
|---|---|---|---|---|
| Solution A | 300,000 | 59,000 | 8000 | 2600 |
| Solution C | 90 | 520 | 520 | 190 | b) Example according to the invention

By using the same equipment but operating with 7.6 liters in each of the beds, which corresponds to a height of approximately 71 centimeters and to a height of the bed/diameter ratio of approximately 6, 960 liters of a fresh batch of solution A are purified at the rate of 140 liters per hour, which corresponds to a residence time of 1.3 minutes, equivalent to that of the Comparative Example. Analysis of the critical elements gives the following results:

|  | Na | Al | Ca | Fe |
|---|---|---|---|---|
| Solution A | 476,000 | 77,000 | 16,700 | 5900 |
| Solution C | 65 | 290 | 53 | 51 |

These results clearly show the advantage which there is in employing the process according to the invention. It is then possible to obtain ultrapure hydrogen peroxide solutions containing less than 500 ppt of each of the metal cations from groups IA to VIIA and from groups IB to VIII of the table of the Periodic Classification of the Elements.

We claim:

1. A process for the preparation of an ultra pure hydrogen peroxide solution, comprising at least one sequence which includes successively passing a hydrogen peroxide solution to be purified through at least one bed of cation-exchange adsorbents and at least one bed of anion-exchange adsorbents, wherein the beds of adsorbents each exhibit a height to diameter ratio of between 5 and 10.

2. The process according to claim 1, wherein the ratio is approximately 6.

3. The process according to claim 1, further comprising, upstream and/or downstream of the at least one sequence, one or more purification stages, and optionally, a prior operation in which said solution to be purified is brought to a desired concentration.

4. The process according to claim 3, wherein the one or more purification stages are selected from the group consisting of distillation, liquid extraction, crystallization, absorption, filtration, ultrafiltration, nanofiltration and reverse osmosis.

5. The process according to claim 3, wherein the solution to be purified is a technical hydrogen peroxide solution at a concentration of 30% to 70% by weight, said solution being distilled and brought to a desired concentration in a prior operation.

6. The process according to claim 3, wherein the solution to be purified is a technical quality or food quality hydrogen peroxide solution at a concentration of approximately 50 to 70% by weight, said solution being subjected to a pretreatment as follows:

a distillation/concentration stage to obtain a condensate having a concentration of greater than 80%;

purification of the condensate by low-temperature crystallization and removal of a supernatant;

collecting, washing, superficially drying and melting the obtained crystals; and diluting the melted crystals to 30 to 35% with deionized water of ultrapure electronic quality.

7. The process according to claim 1, wherein the at least one bed of anion-exchange adsorbents contains carboxylate ions of formula R—COO$^-$ in which R represents a hydrogen atom, an aryl radical containing from 6 to 10 carbon atoms or an alkyl radical containing from 1 to 4 carbon atoms, the aryl and alkyl radicals being either unsubstituted or substituted by one or more fluorine atoms.

8. The process according to claim 7, wherein the carboxylate ion of formula R—COO$^-$ is a formate ion, an acetate ion, a fluoroacetate ion, a triofluoroacetate ion or a benzoate ion.

9. The process according to claim 8, wherein the carboxylate ion of formula R—COO$^-$ is an acetate ion.

10. The process according to claim 8, wherein two successive sequences are performed, the first sequence comprising passing the solution to be purified through a bed of anion-exchange adsorbents containing acetate ions followed by a bed of cation-exchange adsorbents, and the second sequence comprising passing the solution from the first sequence through a bed of anion-exchange adsorbents containing carbonate or bicarbonate ions followed by a bed of cation-exchange adsorbents.

11. The process according to claim 1, wherein the hydrogen peroxide solution to be purified is passed through the at least one bed of cation-exchange adsorbents and the at least one bed of anion-exchange adsorbents at a throughput of from 10 to 30 hour$^{-1}$.

* * * * *